(12) United States Patent
Hsu et al.

(10) Patent No.: US 7,876,410 B2
(45) Date of Patent: Jan. 25, 2011

(54) MULTI-DOMAIN VERTICALLY ALIGNED LIQUID CRYSTAL DISPLAY HAVING A PLURALITY OF JAGGED AND NON-JAGGED SLITS

(75) Inventors: Che-Ming Hsu, Tainan (TW);
Ming-Feng Hsieh, Tainan (TW);
Chih-Yung Hsieh, Tainan (TW);
Chien-Hong Chen, Tainan (TW);
Wang-Yang Li, Tainan (TW)

(73) Assignee: Chimei Innolux Corporation (TW)

( * ) Notice: Subject to any disclaimer, the term of this patent is extended or adjusted under 35 U.S.C. 154(b) by 702 days.

(21) Appl. No.: 11/698,695

(22) Filed: Jan. 26, 2007

(65) Prior Publication Data

US 2007/0121048 A1 May 31, 2007

Related U.S. Application Data

(63) Continuation-in-part of application No. 11/261,944, filed on Oct. 28, 2005, now abandoned.

(30) Foreign Application Priority Data

Jan. 26, 2006  (TW) ............................... 95103010 A

(51) Int. Cl.
G02F 1/1337 (2006.01)
G02F 1/1343 (2006.01)
(52) U.S. Cl. ...................................... 349/129; 349/143
(58) Field of Classification Search ......... 349/125–129, 349/143
See application file for complete search history.

(56) References Cited

U.S. PATENT DOCUMENTS 6,671,019 B1 * 12/2003 Petschek et al. ............. 349/129
2002/0075437 A1  6/2002 Fukumoto et al.
2003/0011734 A1  1/2003 Liu et al.

FOREIGN PATENT DOCUMENTS

TW    552449    9/2003
TW  200519464   5/2006
TW  200532340   5/2007

* cited by examiner

*Primary Examiner*—David Nelms
*Assistant Examiner*—Paul C Lee
(74) *Attorney, Agent, or Firm*—Trop Pruner & Hu, P.C.

(57) ABSTRACT

A multi-domain vertically aligned liquid crystal display includes an active element array substrate, an opposite substrate, and a liquid crystal layer disposed between the two substrates. The active element array substrate has a plurality of pixel units. Each pixel unit has a pixel electrode and the pixel electrode includes a first alignment pattern and a second alignment pattern. The opposite substrate includes a plurality of common electrodes and each common electrode includes a third alignment pattern and a fourth alignment pattern. The liquid crystal layer proximal each pixel unit is divided into a first domain set and a second domain set, wherein the first alignment pattern and the third alignment pattern correspond to the first domain set, and the second alignment pattern and the fourth alignment pattern correspond to the second domain set.

21 Claims, 17 Drawing Sheets

US 7,876,410 B2

MULTI-DOMAIN VERTICALLY ALIGNED LIQUID CRYSTAL DISPLAY HAVING A PLURALITY OF JAGGED AND NON-JAGGED SLITS

CROSS REFERENCE TO RELATED APPLICATION

This claims priority under 35 U.S.C. §119 of Taiwan Application No. 095103010, filed Jan. 26, 2006. This application is a continuation-in-part of prior application Ser. No. 11/261,944 filed Oct. 28, 2005 now abandoned.

TECHNICAL FIELD

This invention relates to a display, more particularly to a multi-domain vertically aligned liquid crystal display.

BACKGROUND

The ever-increasing demand for displays has motivated display manufacturers to develop various types of displays. The cathode ray tube (CRT) display, in particular, has long dominated the display market. However, because of high power consumption and high radiation emission of CRT displays, other types of displays, such as the thin film transistor liquid crystal display (TFT-LCD), have become more popular. TFT-LCDs have the advantages of providing high display quality, space efficiency, low power consumption, and no radiation emission.

Generally, LCDs exhibit high contrast ratio, no gray scale inversion, small color shift, high luminance, excellent color richness, high color saturation, quick response, and wide viewing angle. Example types of LCDs that are able to provide wide viewing angles include the following: twisted nematic LCDs with wide viewing film, in-plane switching (IPS) LCDs, fringe field switching LCDs, and multi-domain vertically aligned (MVA) LCDs.

MVA LCDs are able to have wide viewing angles due to provision of alignment protrusions and/or slits disposed on a color filter substrate or thin film transistor array substrate. The alignment protrusions and/or slits enable liquid crystal molecules of the LCD to align in various directions so that multiple alignment domains are achieved. However, with conventional MVA LCDs, when viewing angle changes, the brightness of the MVA LCD may change as well, leading to color shift and insufficient color saturation.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a multi-domain vertically aligned (MVA) LCD panel is provided that is able to reduce changes in luminance when the viewing angle changes. An MVA LCD panel can include an active element array substrate, an opposite substrate, and a liquid crystal layer, where the active element array substrate has a plurality of pixel units (arranged in an array of pixel units) and the liquid crystal layer is disposed between the active element array substrate and the opposite substrate. The liquid crystal layer proximal each pixel unit is divided into a plurality of domain sets, wherein each domain set has various domains.

According to some embodiments, to reduce changes in the luminance of an MVA LCD when the viewing angle changes, each of the pixel units of the active element array substrate is divided into multiple domain sets to achieve the objective of reducing luminance changes. For example, each pixel unit is divided into a first domain set and a second domain set, where both the first domain set and the second domain set include several domains (e.g., four domains, A, B, C, and D).

Conventionally, to drive an LCD panel, a driving voltage is input into the pixel electrode of each individual pixel unit via a data line and a common electrode is maintained at a common voltage so that the effective electric fields provided to the liquid crystal layer between the pixel unit and the common electrode are the same. Note, however, according to some embodiments, a pixel electrode and a common electrode can be patterned such that although the voltage drop between the pixel electrode and the common electrode is the same, the effective electric field distributions provided to the portions of liquid crystal layer proximal the domain set are different. As the effective electric field distributions provided to the liquid crystal layer in each domain set is different, the average tilt angles of the liquid crystal molecules of the liquid crystal layer in different domain sets is different. Therefore, the transmittance of the liquid crystal layer in different domain sets is different, which alleviates the problem of steep change in luminance when the viewing angle changes. The following describes embodiments that include mechanisms to cause the effective electric field distributions provided to portions of the liquid crystal layer in the plural domain sets to differ from each other.

First Embodiment

Figure 1:
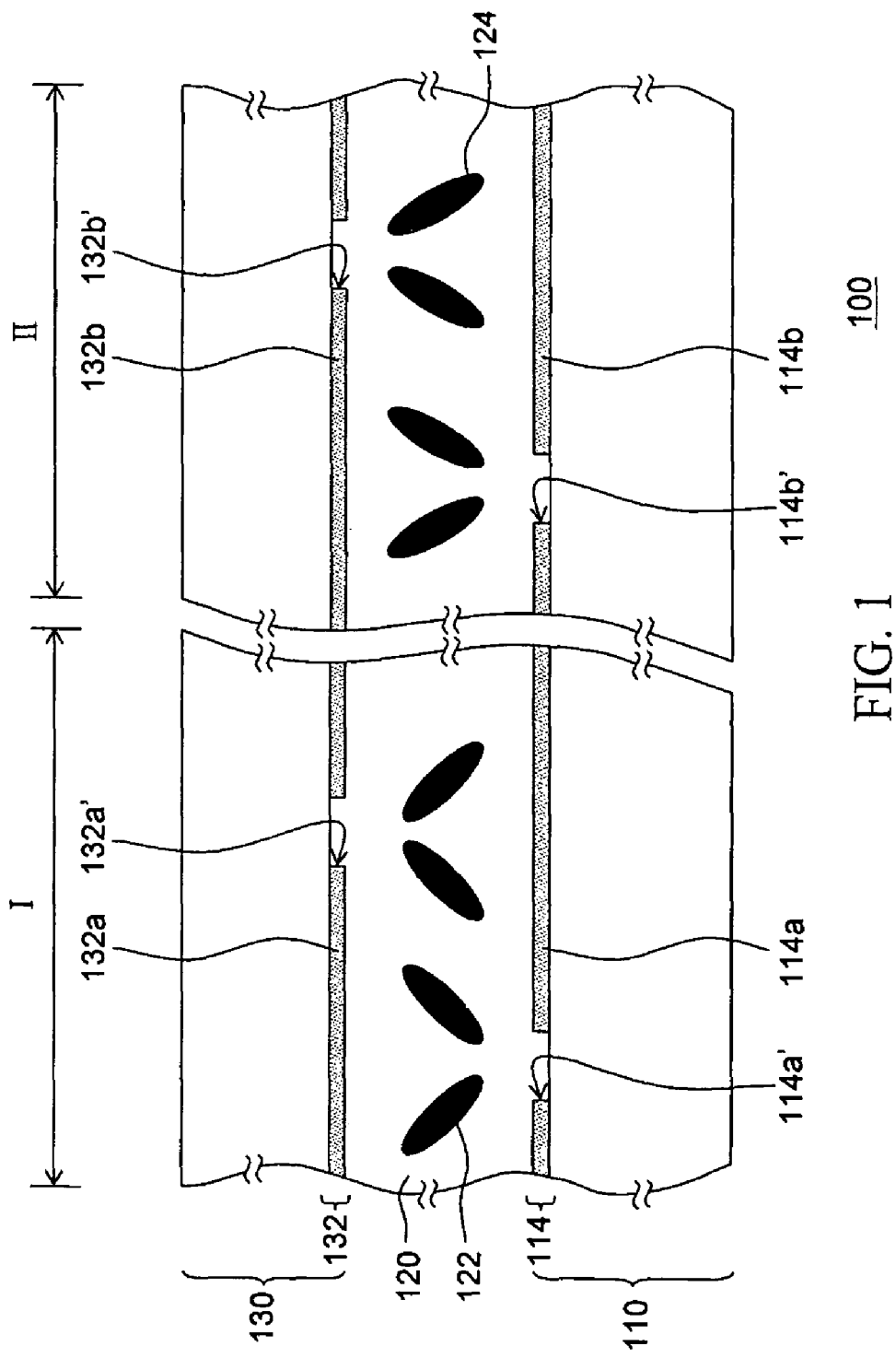
FIG. 1 is a sectional view of a multi-domain vertically aligned (MVA) liquid crystal display (LCD) according to a first embodiment.
Figure 2A:
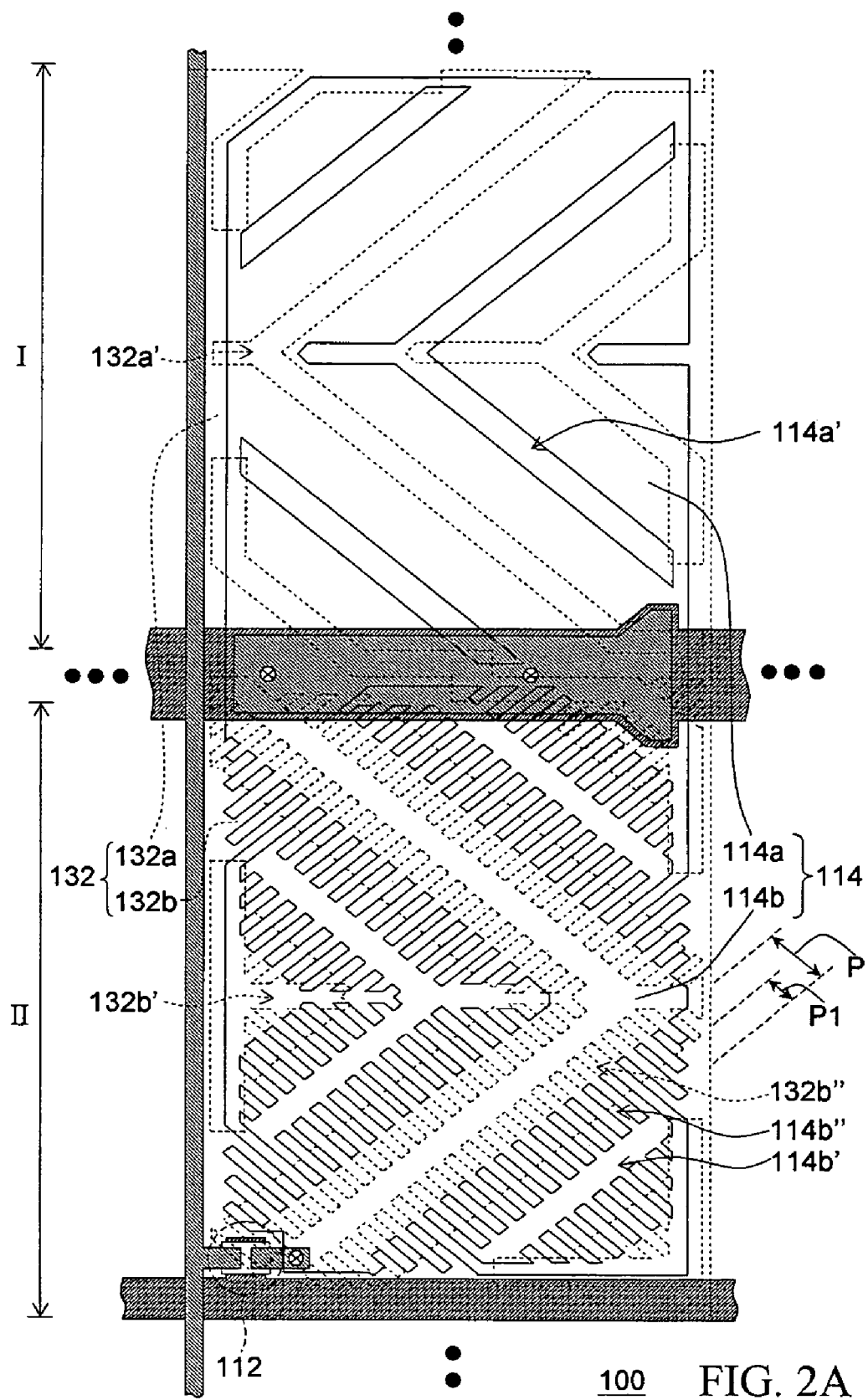
FIG. 2A is a schematic top view of the MVA LCD according to the first embodiment.
Figure 2B:
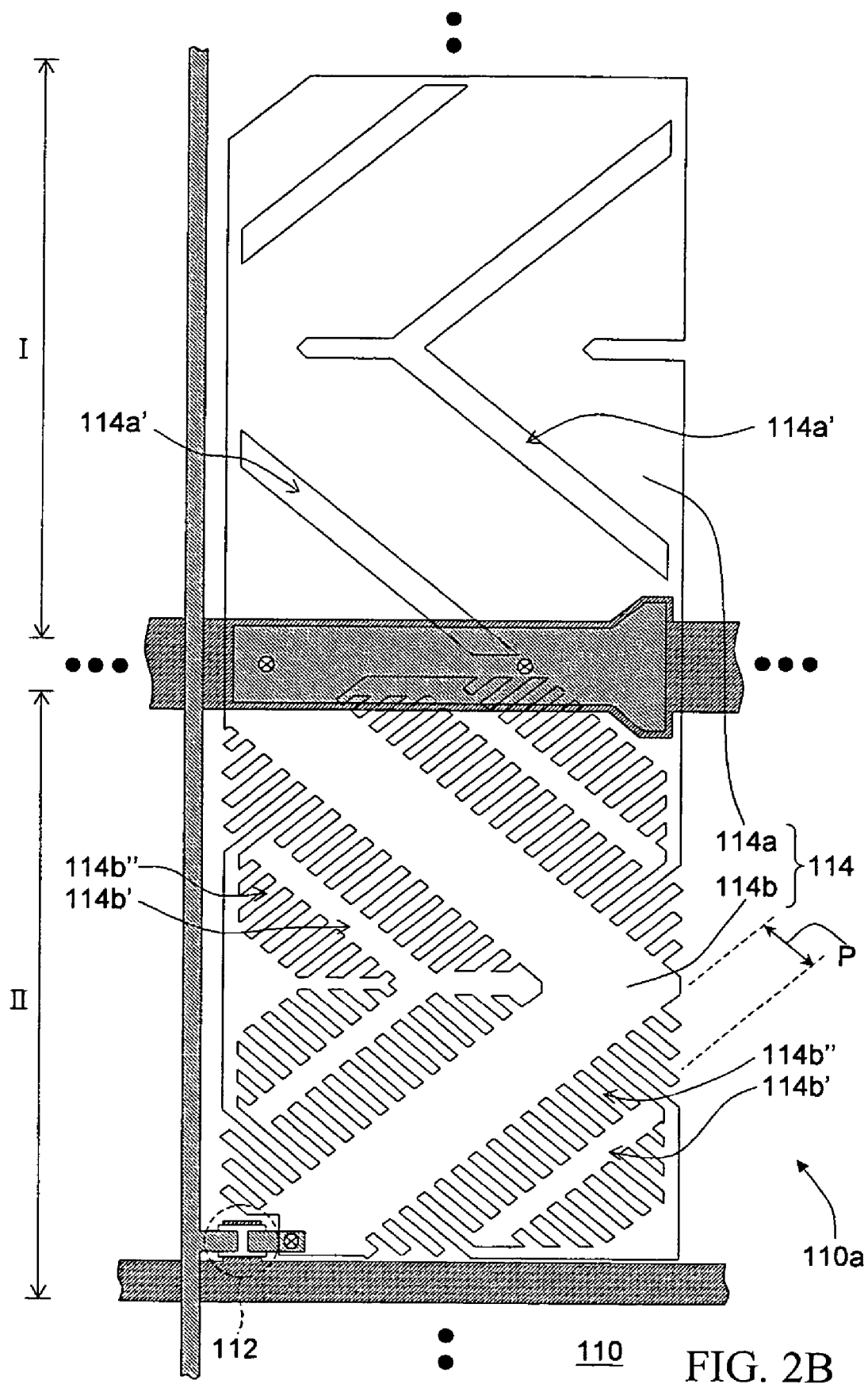
FIGS. 2B and 2C are schematic views of the active element array substrate and the opposite substrate of FIG. 2A respectively.
Figure 2C:
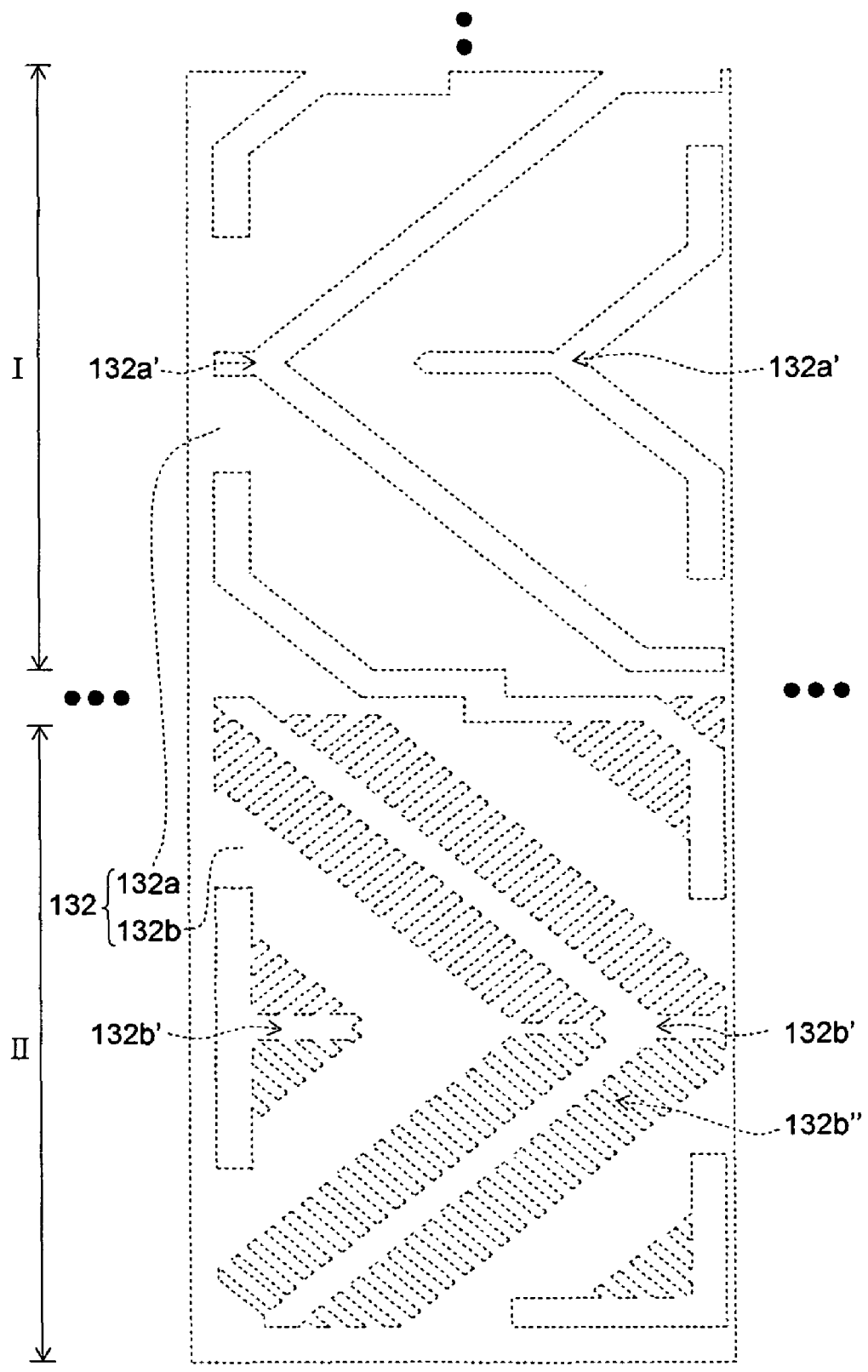

FIG. 1 is a sectional view of a portion of a multi-domain vertically aligned (MVA) liquid crystal display (LCD) according to a first embodiment. The MVA LCD 100 includes an active element array substrate 110, an opposite substrate 130, and a liquid crystal layer 120 portion disposed between the active element array substrate 110 and the opposite substrate 130. Features of the first embodiment of the MVA LCD are also shown in FIGS. 2A-2C. For example, FIG. 2A is a top view of a portion of the MVA LCD according to the first embodiment and FIGS. 2B and 2C show the active element array substrate 110 and opposite substrate 130 respectively. As is shown in FIGS. 1 and 2A-2C, the active element array substrate 110 includes a pixel unit 110*a*. The pixel unit 110*a* includes an active element 112 and a pixel electrode 114; the active element 112 is, for example, a thin film transistor or otherwise a three-end active element. The pixel electrode 114 is electrically connected to the active element 112 and includes a first alignment pattern 114*a* and a second alignment pattern 114*b*. The opposite substrate 130 includes common electrode 132 that faces the active element array substrate 110 and corresponds to the pixel electrode 114. The common electrode 132 includes a third alignment pattern 132*a* and a fourth alignment pattern 132*b*.

Additionally, the liquid crystal layer 120 portion proximal each pixel unit 110*a* is divided into a first domain set I and a second domain set II; both the first domain set I and the second domain set II include several domains (e.g., four domains, A, B, C, and D) with different liquid crystal alignment. A liquid crystal layer portion "proximal" a pixel electrode means that the liquid crystal layer is in the vicinity of the pixel electrode such that the liquid crystal layer portion will be electrically affected by the pixel electrode. The first 114*a* and third alignment patterns 132*a* are in a location that corresponds to that of the first domain set I; the second 114*b* and fourth alignment patterns 132*b* are in a location that corresponds to the second domain set II.

Furthermore, the first alignment pattern 114*a* has a plurality of first non-jagged slits 114*a*′ and the second alignment pattern 114*b* has a plurality of first jagged slits 114*b*′. Likewise, the third alignment pattern 132*a* has a plurality of second non-jagged slits 132*a*′, and the fourth alignment pattern 132*b* has a plurality of second jagged slits 132*b*′. Thus, in some embodiments, the non-jagged slits are located in the area corresponding to the first domain set I and the jagged slits are located in the area of the second domain set II.

In some embodiments, the first jagged slits 114*b*′ and the second jagged slits 132*b*′ may be partially overlapped. For example, the first jagged slits 114*b*′ can have a plurality of first fine slits 114*b*″ with a length of P, and the second jagged slits 132*b*′ can have a plurality of second fine slits 132*b*″, where the length P1 of the overlapped portion of the first fine slits 114*b*″ and the second fine slits 132*b*″ is between P/3 and ⅔ P.

The first alignment pattern 114*a* and the third alignment pattern 132*a* provide an effective electric field distribution to the first domain set I that is different from the effective electric field distribution provided to the second domain set II from the second alignment pattern 114*b* and the fourth alignment pattern 132*b*. As a result, the average tilt angle of the liquid crystal molecules 122 in the first domain set I is different from that of the liquid crystal molecules 124 in the second domain set II.

Particularly, the orientation of the liquid crystal molecules 122, 124 primarily depends upon the direction of the electric field applied thereto. The first to fourth alignment patterns 114*a*, 114*b*, 132*a*, and 132*b* generate a Fringe Field Effect (FFE) which results in horizontal electric fields with different strength. If the same voltage drop (vertical electric fields with the same strength) exists between the pixel electrode 114 and the common electrode 132, the effective electric fields sensed by the liquid crystal molecules 122, 124 differ from each other, which causes the average tilt angle of the liquid crystal molecules 122 in the first domain set I to differ from that of the liquid crystal molecules 124 in the second domain set II. Because the average tilt angles of the liquid crystal display molecules in the first and second domain sets I and II differ, the transmittance of the liquid crystal layer 120 in the first domain set I differs from that in the second domain set II. This greatly reduces dramatic changes in luminance as the viewing angle changes.

Color shift is caused by gamma (γ) curve shifts for different viewing angles and a dramatic change of transmittance corresponding to the central grayscale. The color shift causes the human eye to sense relatively weak or strong luminance which results in relatively white or black images. If the color shift only occurs to the red color of the three primary colors, the image will be relatively red.

According to some embodiments of the present invention, a single pixel unit 110*a* is divided into a first domain set I and a second domain set II. The gamma (γ) curve corresponding to the first domain set I is different from that corresponding to the second domain set II, such that for the same grayscale, when the MVA LCD is viewed directly, the transmittance corresponding to the first domain set I can be higher than the original transmittance, and the transmittance corresponding to the second domain set II can be lower than the original transmittance. Therefore, the human eye senses the original transmittance because it integrates these transmittances. Because the gamma (γ) curves corresponding to the first domain set I and the second domain set II belong to high grayscale and low grayscale parts that do not shift as the viewing angle changes, the human eye still senses the original transmittance due to integration of these transmittances. Thus, as the viewing angle changes, dramatic changes in luminance are greatly eliminated, thereby eliminating the color shift phenomenon.

Figure 3:
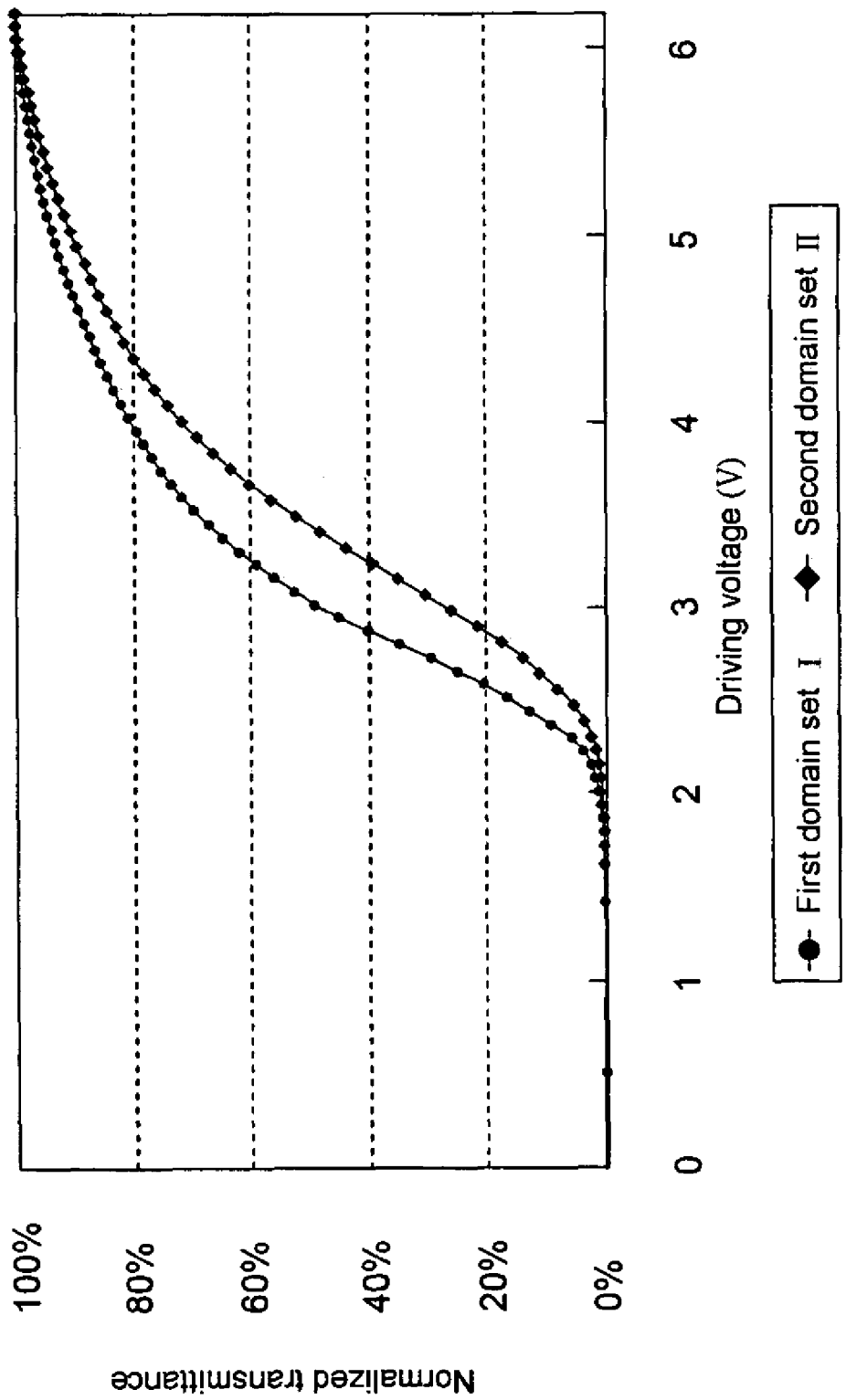
FIG. 3 is a chart curve representing relationships of voltage to normalized transmittance percentage according to the first embodiment.

FIG. 3 is a graph of curves (for different form factors of slits) representing relationships of driving voltage versus normalized transmittance percentage. The horizontal coordinate represents the driving voltage, and the vertical coordinate represents the normalized transmittance percentage. The curve with circles represents the first domain set I and the curve with squares represents the second domain set II. It can be seen from FIG. 3 that at the same driving voltage the transmittance of the first domain set I is different from that of the second domain set II. Therefore, when the viewing angle changes the first domain set I and the second domain set II compensate each other to eliminate a dramatic change in luminance as the viewing angle changes.

Although the first embodiment depicts the first jagged slits 114*b*′ and the second jagged slits 132*b*′ as being partially overlapped, the relative position between the first jagged slits 114*b*′ and the second jagged slits 132*b*′ is not limited thereto. In other embodiments, the first jagged slits 114*b*′ and the second jagged slits 132*b*′ do not overlap. Furthermore embodiments are not limited to the liquid crystal layer proximal the pixel unit being divided into two domain sets; it may be further divided into more than three domain sets, matching with the appropriate alignment patterns, so as to avoid steep changes in the luminance as the viewing angle changes.

Second Embodiment

Figure 4A:
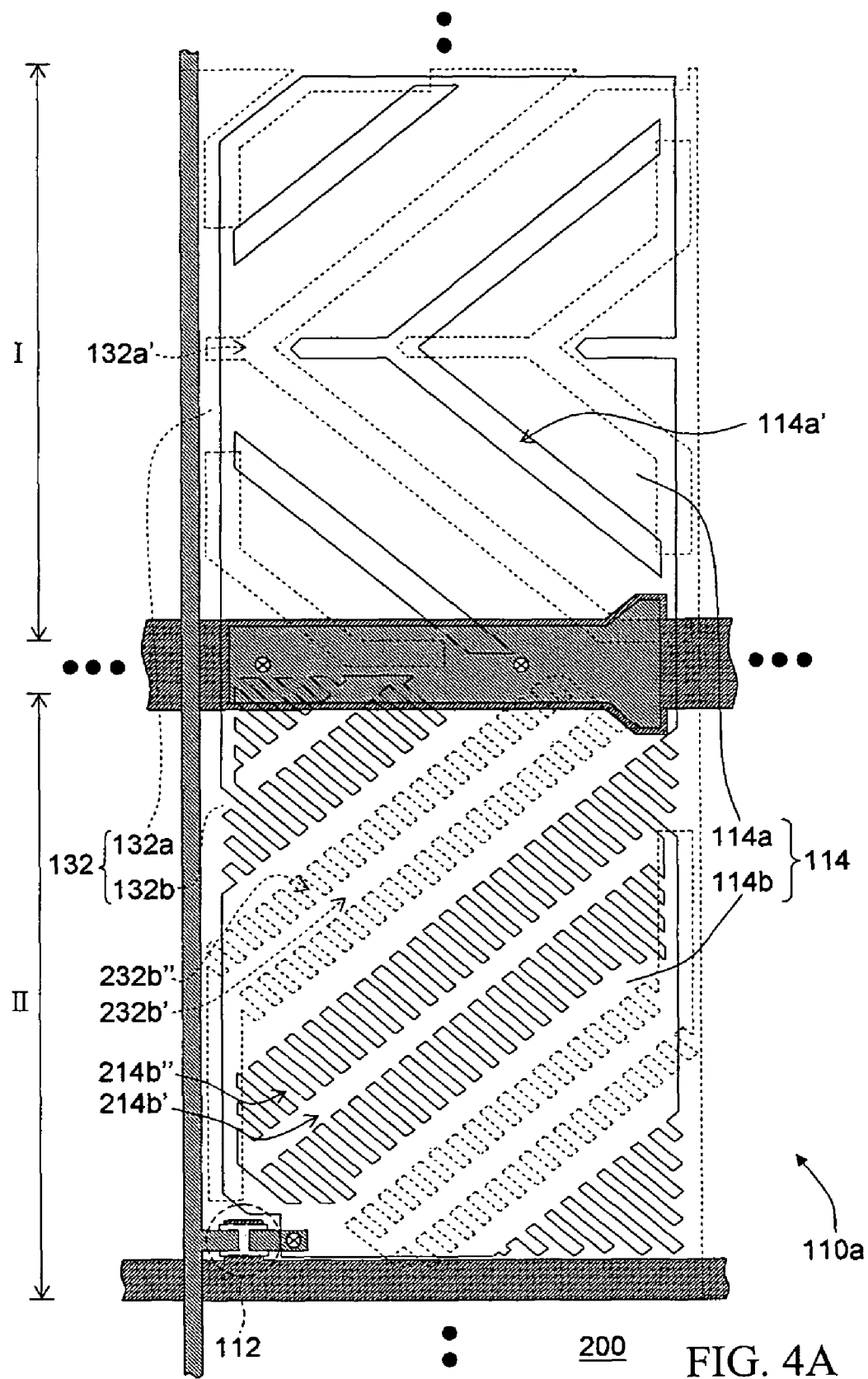
FIG. 4A is a schematic top view of a MVA LCD according to a second embodiment.
Figure 4B:
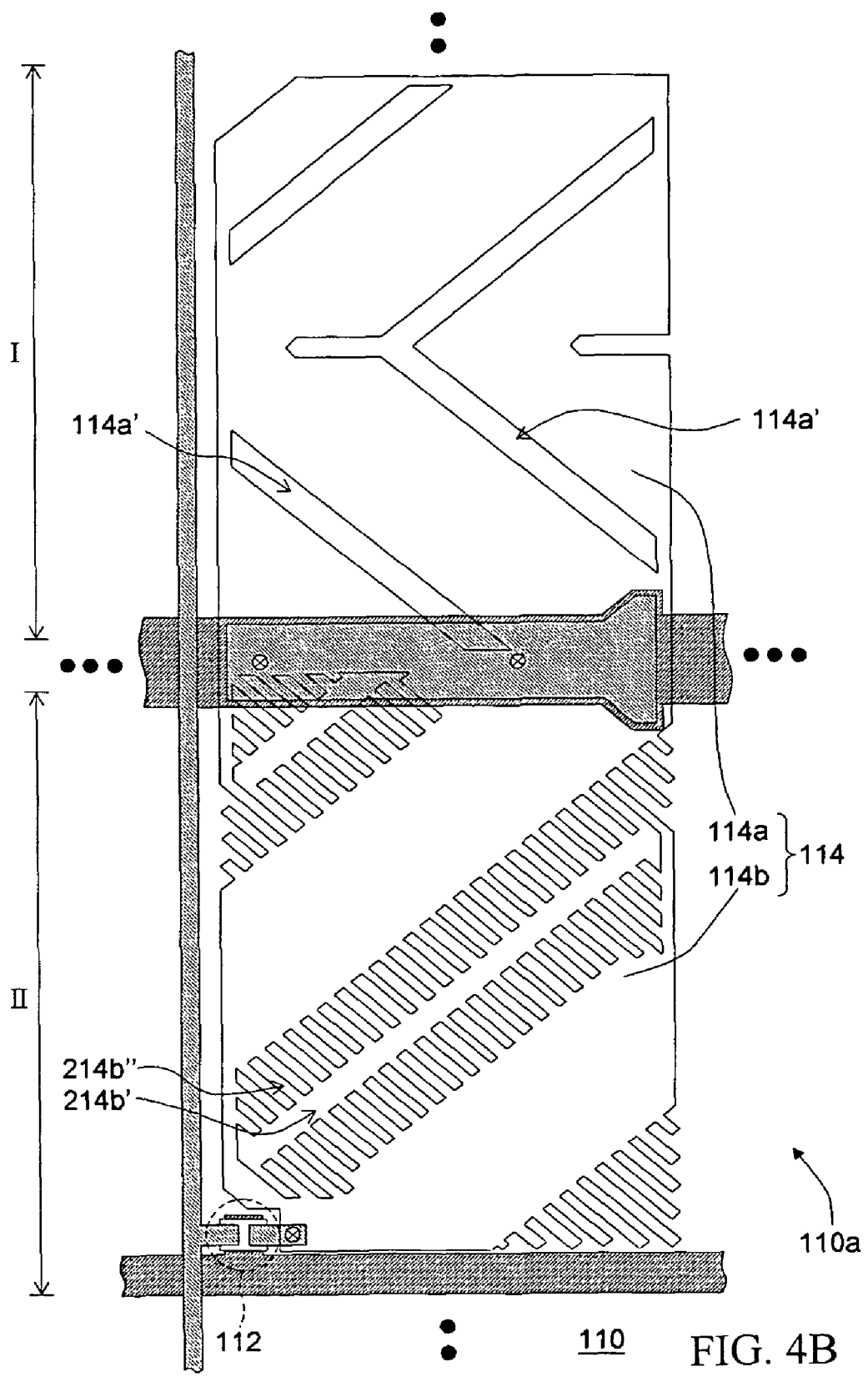
FIGS. 4B and 4C are schematic views of the active element array substrate and the opposite substrate of FIG. 4A respectively.
Figure 4C:
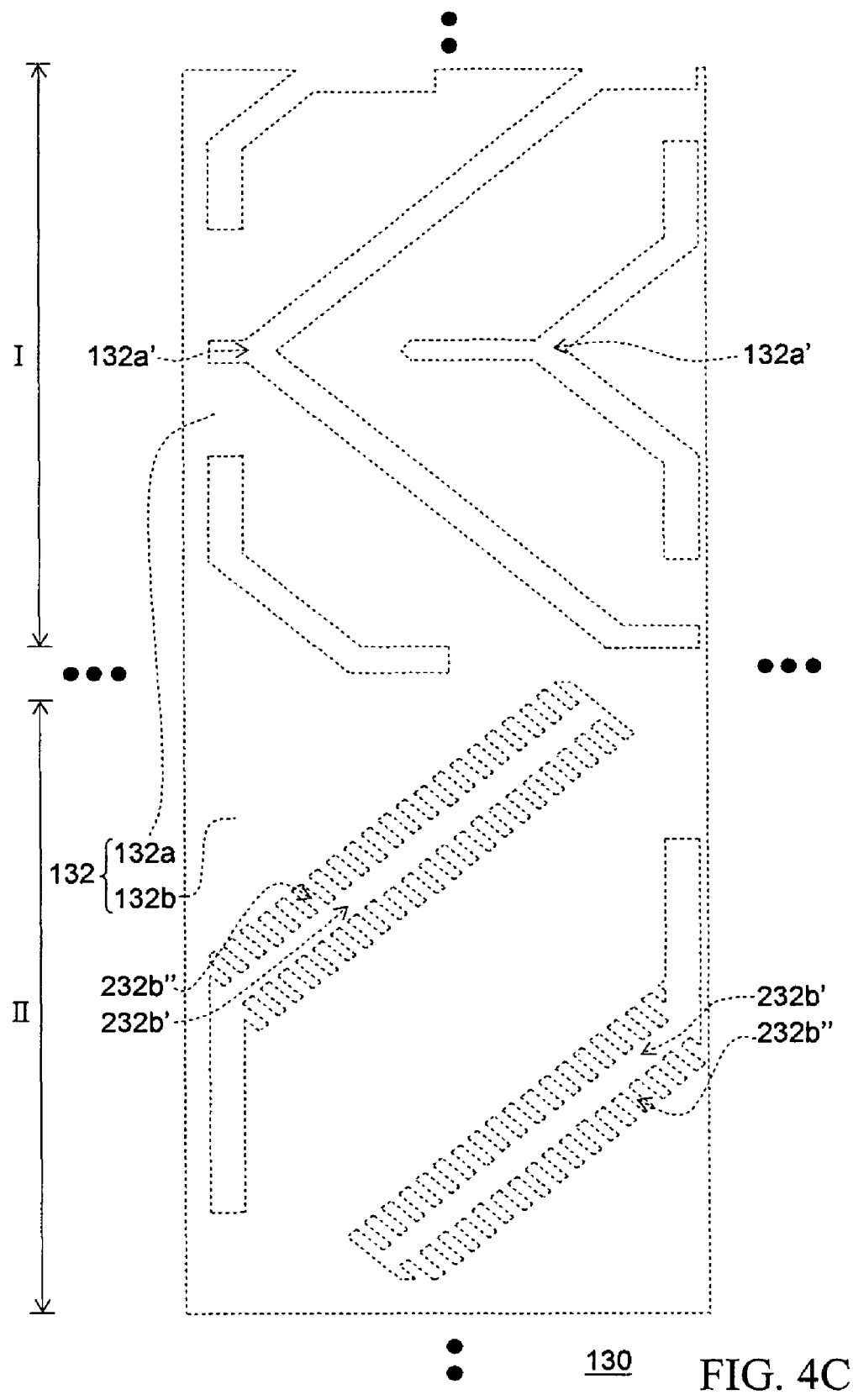

FIG. 4A is a top view of a portion of a MVA LCD according to a second embodiment. FIGS. 4B and 4C show the active element array substrate and the opposite substrate of FIG. 4A respectively. The arrangements shown in FIGS. 4A-4C are similar to that shown in FIGS. 2A-2C, with the difference being that, in the MVA LCD 200 of the second embodiment the first jagged slits 214$b'$ and the second jagged slits 232$b'$ are not overlapped. Specifically, the first fine slits 214$b''$ and the second fine slits 232$b''$ are not overlapped in the second embodiment. For example, the length of the first fine slits 214$b''$ is different from that of the second fine slits 232$b''$. In contrast, as is shown in FIGS. 2A-2C, the length of the first fine slits 114$b''$ is the same as that of the second fine slits 132$b''$. The length of the fine slits, however, is not limited in embodiments of the present invention.

Figure 5:
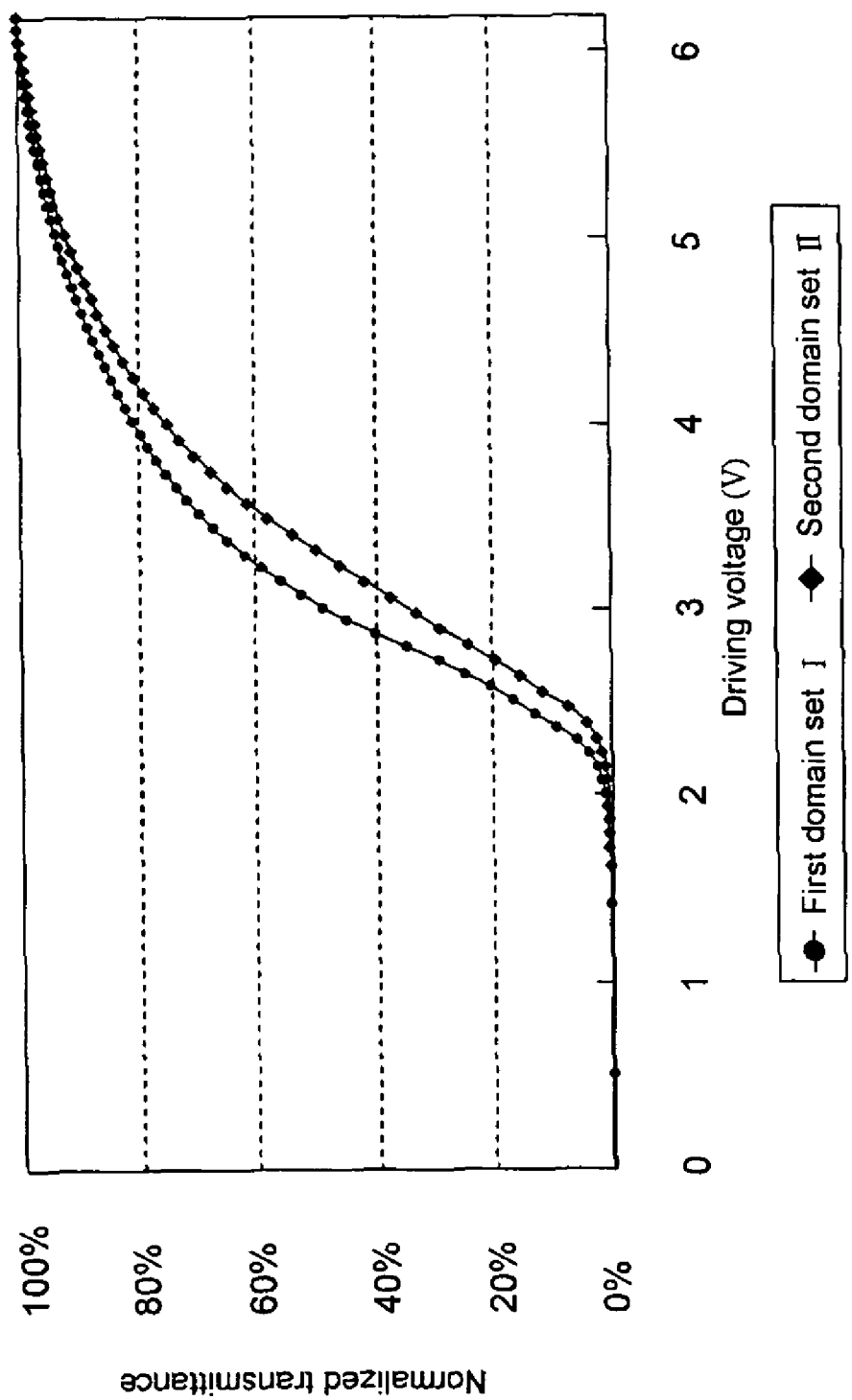
FIG. 5 is a chart curve representing relationships of voltage to normalized transmittance percentage according to the second embodiment.

FIG. 5 is a graph of curves representing relationships of driving voltage versus normalized transmittance percentage for different domain sets of the MVA LCD according to the second embodiment. The horizontal coordinate represents the driving voltage, and the vertical coordinate represents the normalized transmittance. The curve with circles represents the first domain set I and the curve with squares represents the second domain set II. It can be seen from FIG. 5 that, at the same driving voltage, the transmittance of the first domain set I is different from that of the second domain set II. Therefore, when the viewing angle changes the first domain set I and the second domain set II compensate each other to eliminate a dramatic change in luminance as the viewing angle changes.

Note that, in some embodiments the area of the first domain set I and second domain set II are the same although embodiments are not so limited.

Third Embodiment

Figure 6A:
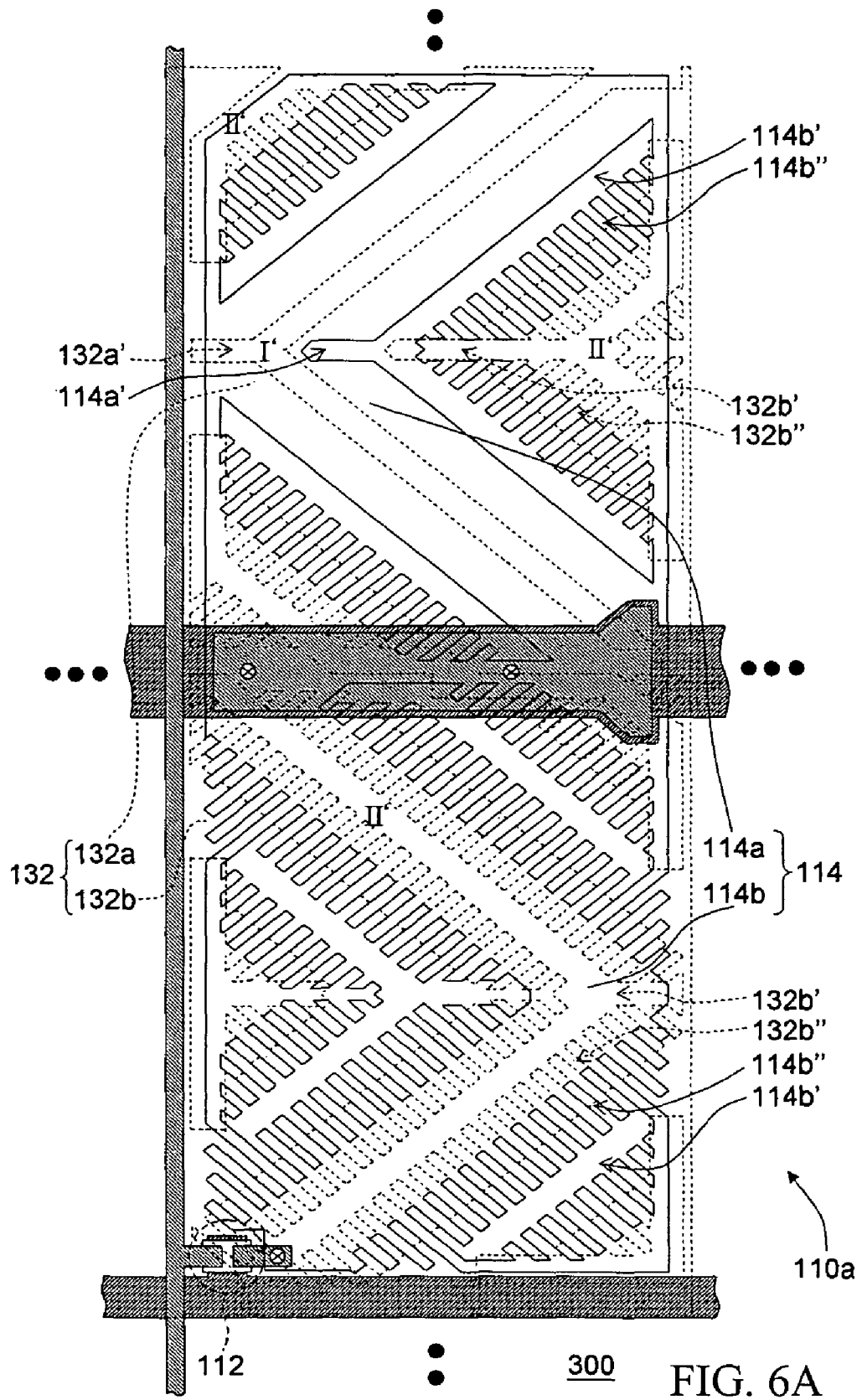
FIG. 6A is a schematic top view of a MVA LCD according to a third embodiment.
Figure 6B:
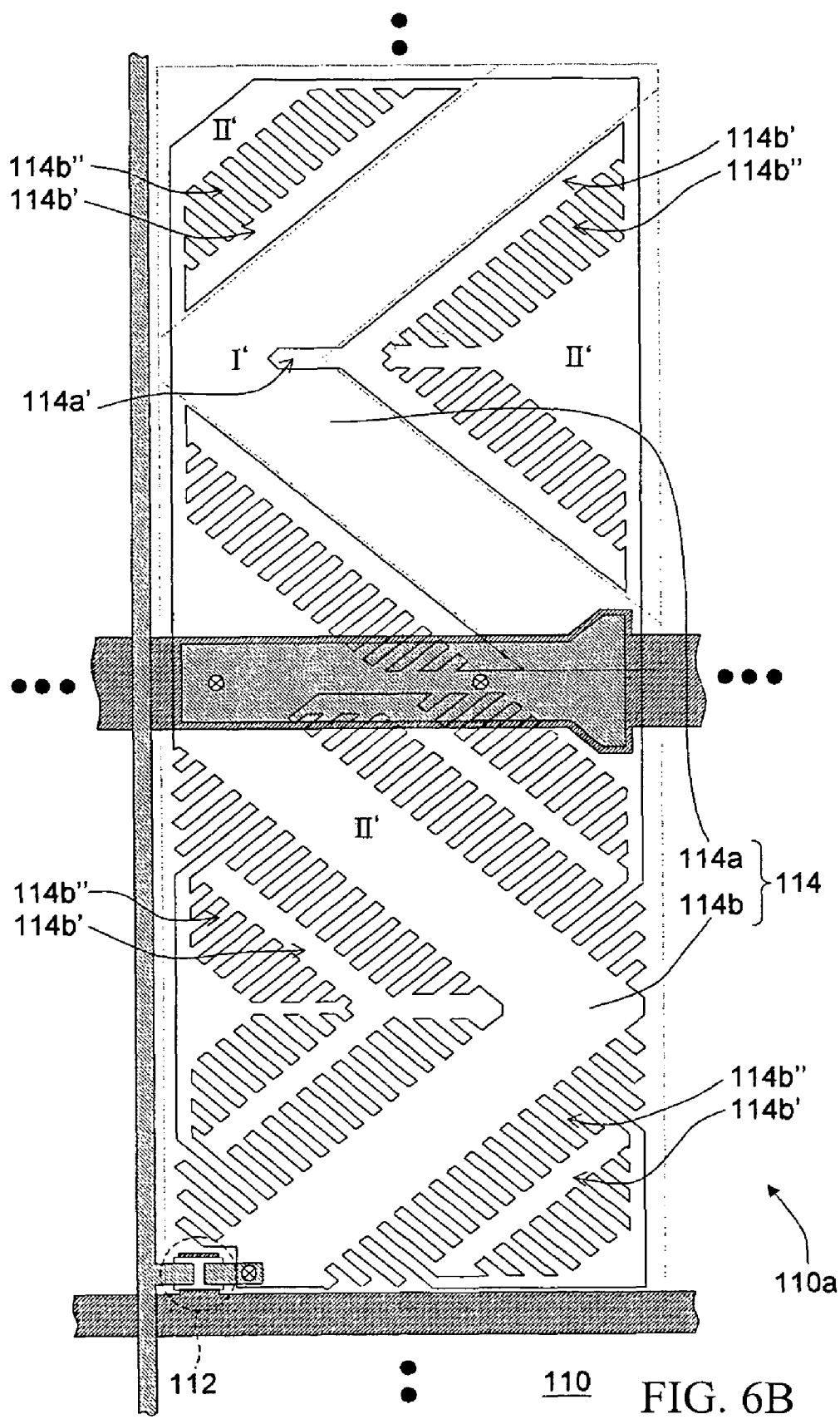
FIGS. 6B and 6C are schematic views of the active element array substrate and the opposite substrate of FIG. 6A respectively.
Figure 6C:
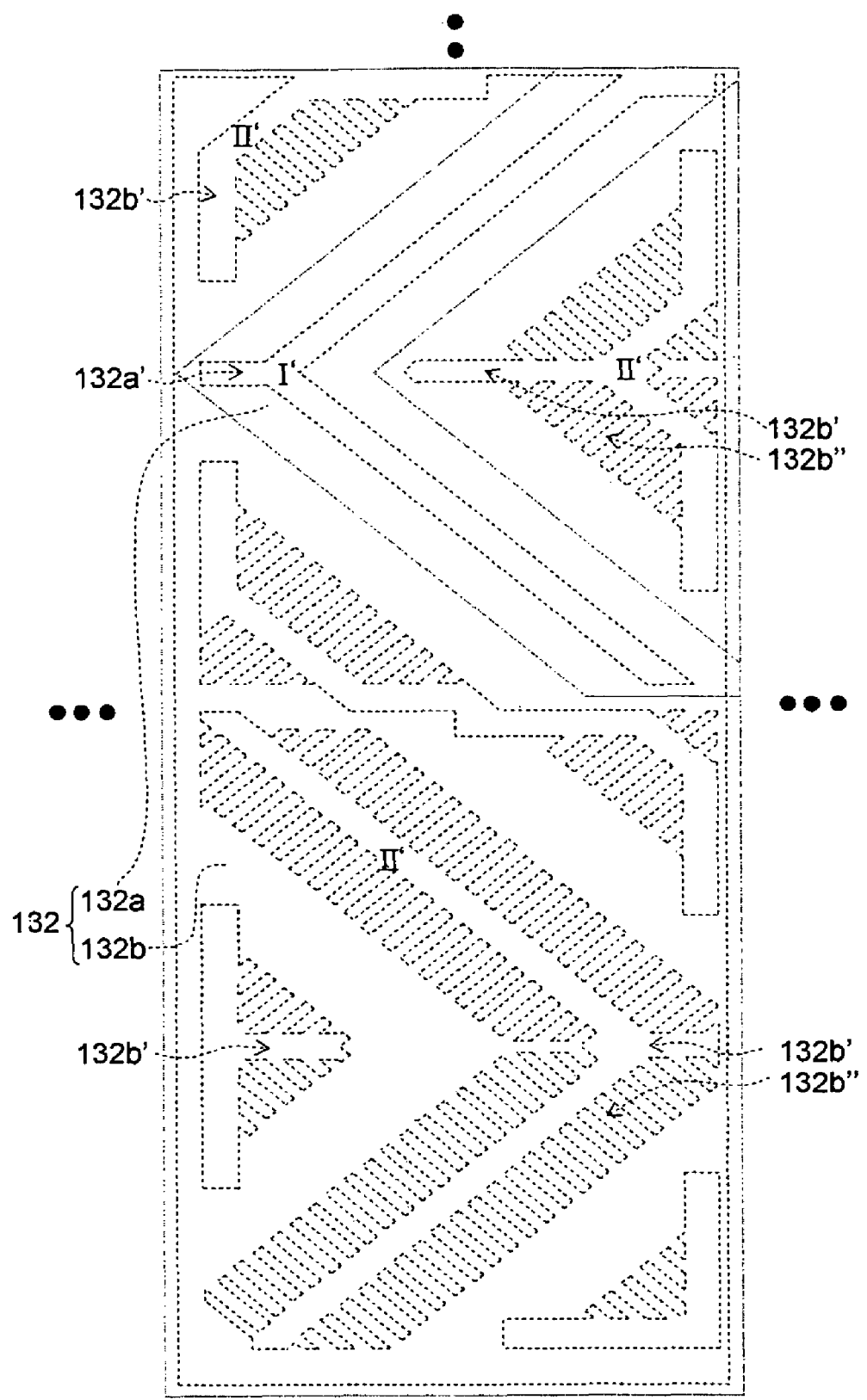

FIG. 6A is a top view of a portion of a MVA LCD according to a third embodiment and FIGS. 6B and 6C show the active element array substrate and the opposite substrate of FIG. 6A respectively. The arrangements shown in FIGS. 6A-6C are similar to that shown in FIGS. 2A-2C, with the difference being that in the MVA LCD of the third embodiment the area of the first domain set I' is different from that of the second domain set II'. Particularly, if the same voltage is supplied to the liquid crystal layer in the locations of domain sets I' and II', the area corresponding to the first domain set I' has greater luminance when viewed from the front. To achieve a preferred display quality with pixel units having a small area with greater luminance, the area of the first domain set I' should be between A/4 and A/2 where A is the area of the second domain set II'.

In other words, the area of the first domain set I' is between 20%-30% of the area of the pixel unit 100$a$, and the area of the second domain set II' is between 70%-80% of the area of the pixel unit 100$a$, although embodiments are not so limited. That is, in other embodiments, the area of the first domain set I' may be larger than that of the second domain set II'.

Note that, although the alignment patterns depicted in the above three embodiments include non-jagged slits and jagged slits, alignment patterns are not so limited.

Fourth Embodiment

Figure 7:
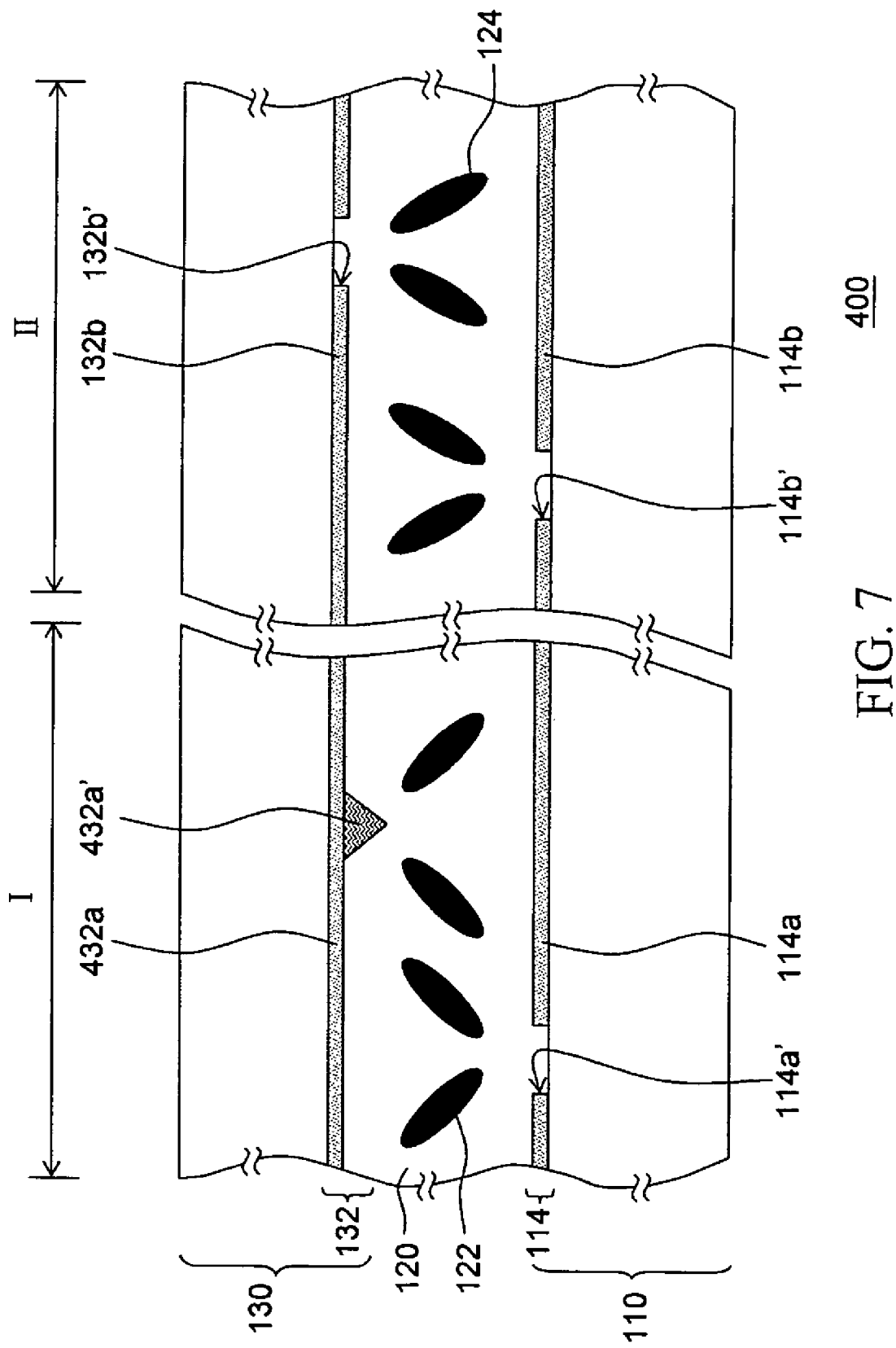
FIG. 7 is a sectional view of a MVA LCD according to a fourth embodiment.
Figure 8A:
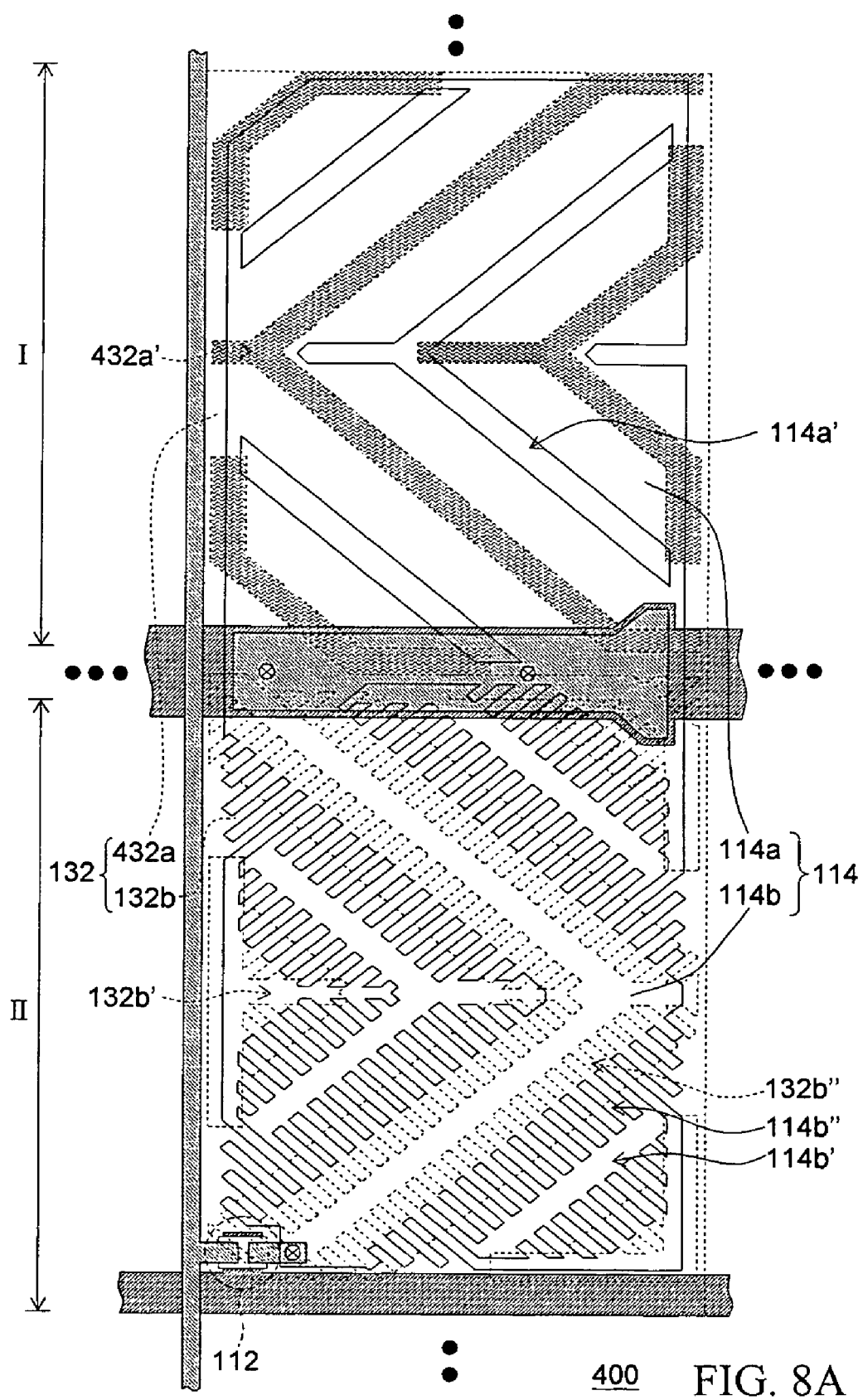
FIG. 8A is a schematic top view of the MVA LCD according to the fourth embodiment.
Figure 8B:
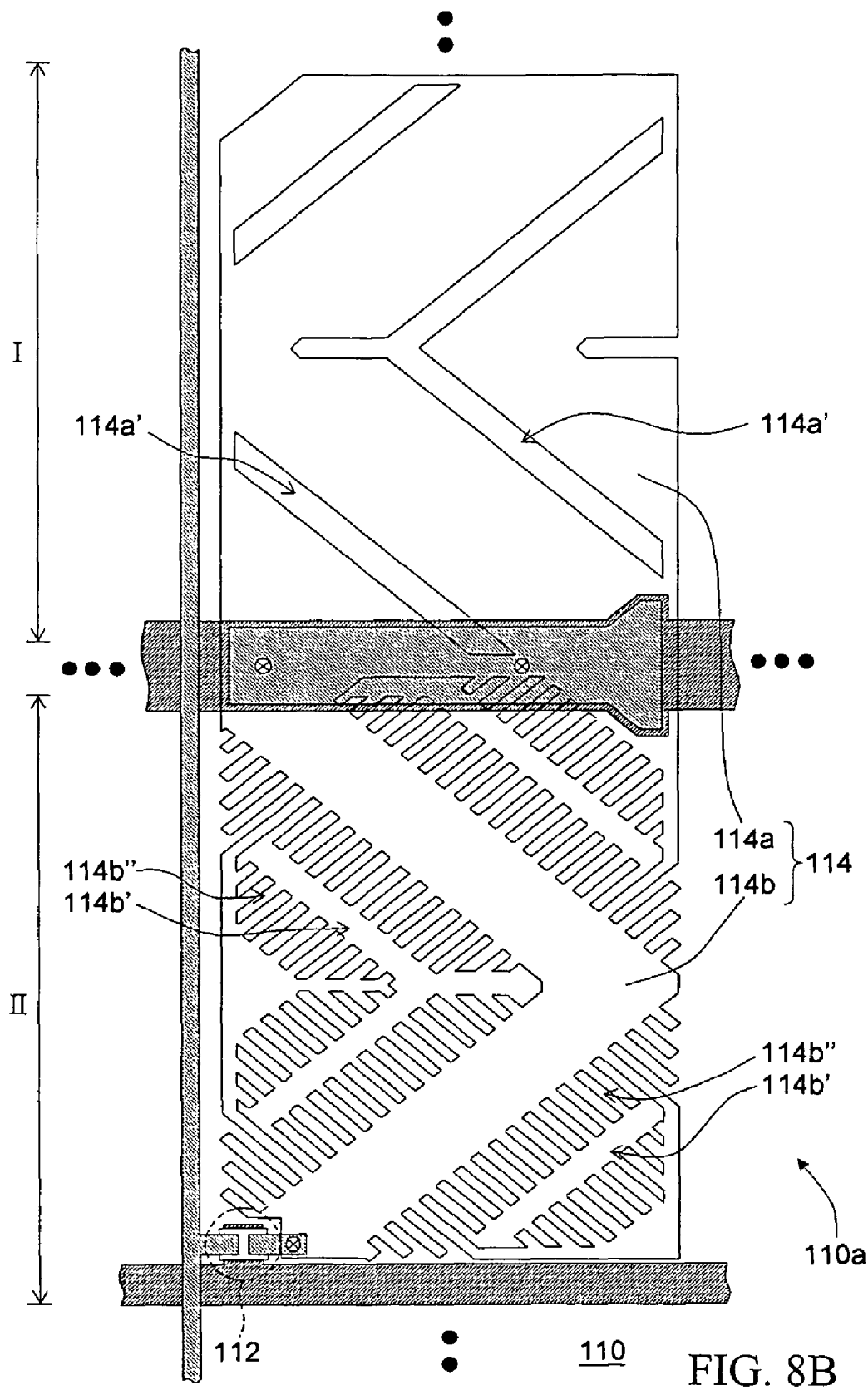
FIGS. 8B and 8C are schematic views of the active element array substrate and the opposite substrate of FIG. 8A respectively.
Figure 8C:
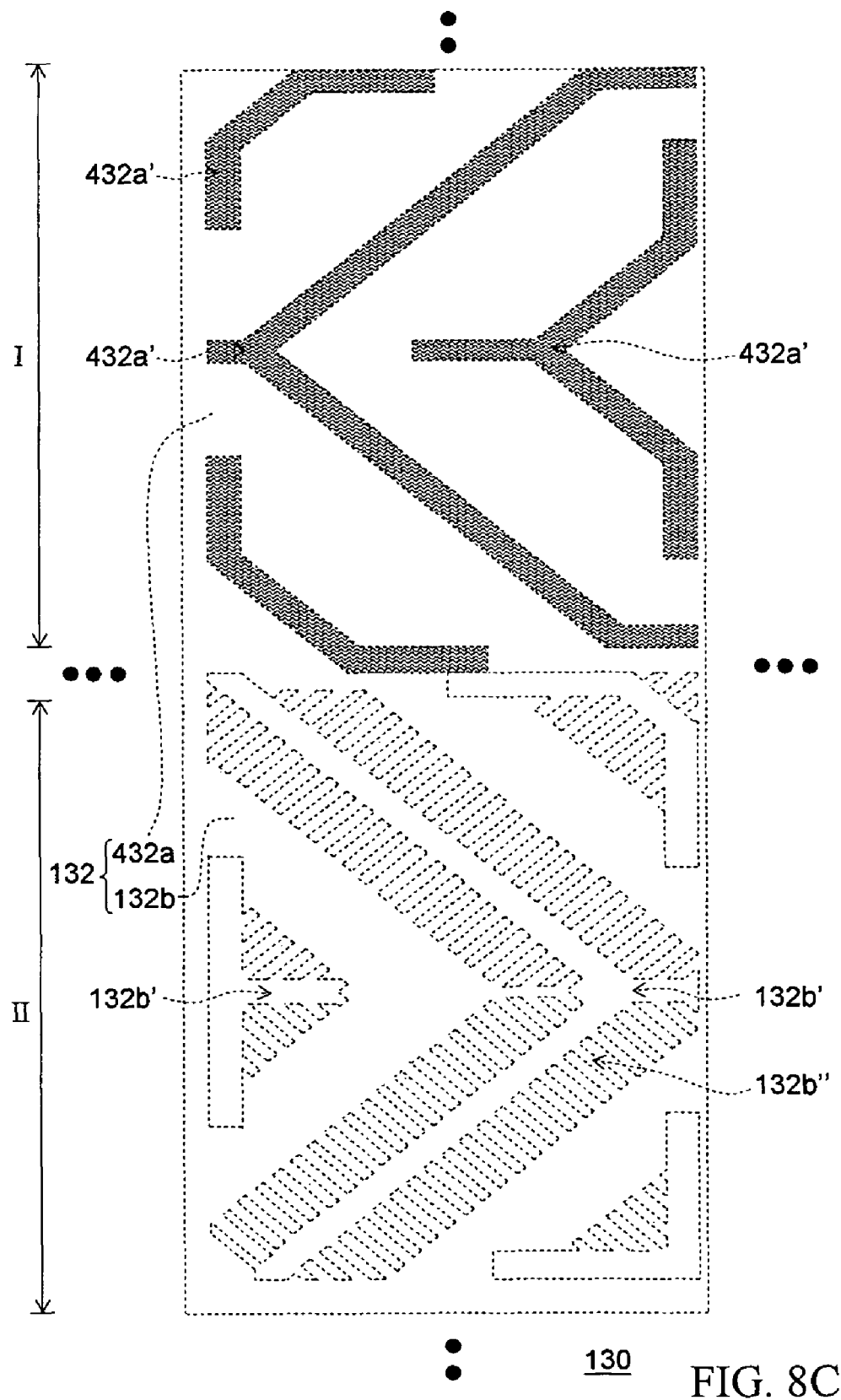

FIG. 7 is a sectional view of a portion of a MVA LCD according to a fourth embodiment, and FIG. 8A is a top view of the portion of the MVA LCD shown in FIG. 7. FIGS. 8B and 8C show the active element array substrate and the opposite substrate of FIG. 8A respectively. Referring to FIG. 7 and FIGS. 8A-8C, the MVA LCD 400 is similar to the MVA LCD 100 shown in FIGS. 1 and 2A, with the difference being that in the fourth embodiment the third alignment patterns 432$a$ have a plurality of alignment protrusions 432$a'$.

The alignment protrusions 432$a'$ can change the power distribution between the liquid crystal molecules 122 and the interface of the third alignment patterns 432$a$. This, and together with the design of the first alignment patterns 114$a$, can cause the average tilt angle of the liquid crystal molecules 122 in the first domain set I to differ from that of the liquid crystal molecules 124 in the second domain set II. In turn, the transmittance of the liquid crystal layer 120 in the first domain set I differs from that in the second domain set II. Thus, dramatic changes in luminance as the viewing angle changes is greatly reduced.

The alignment protrusions 432$a'$ may be triangular alignment protrusions, but the shape of the alignment protrusions 432$a'$ is not so limited. For example, in some embodiments the alignment protrusions 432$a'$ may be semi-spherical alignment protrusions, pyramid-shaped alignment protrusions, or any other suitable shape.

Figure 9:
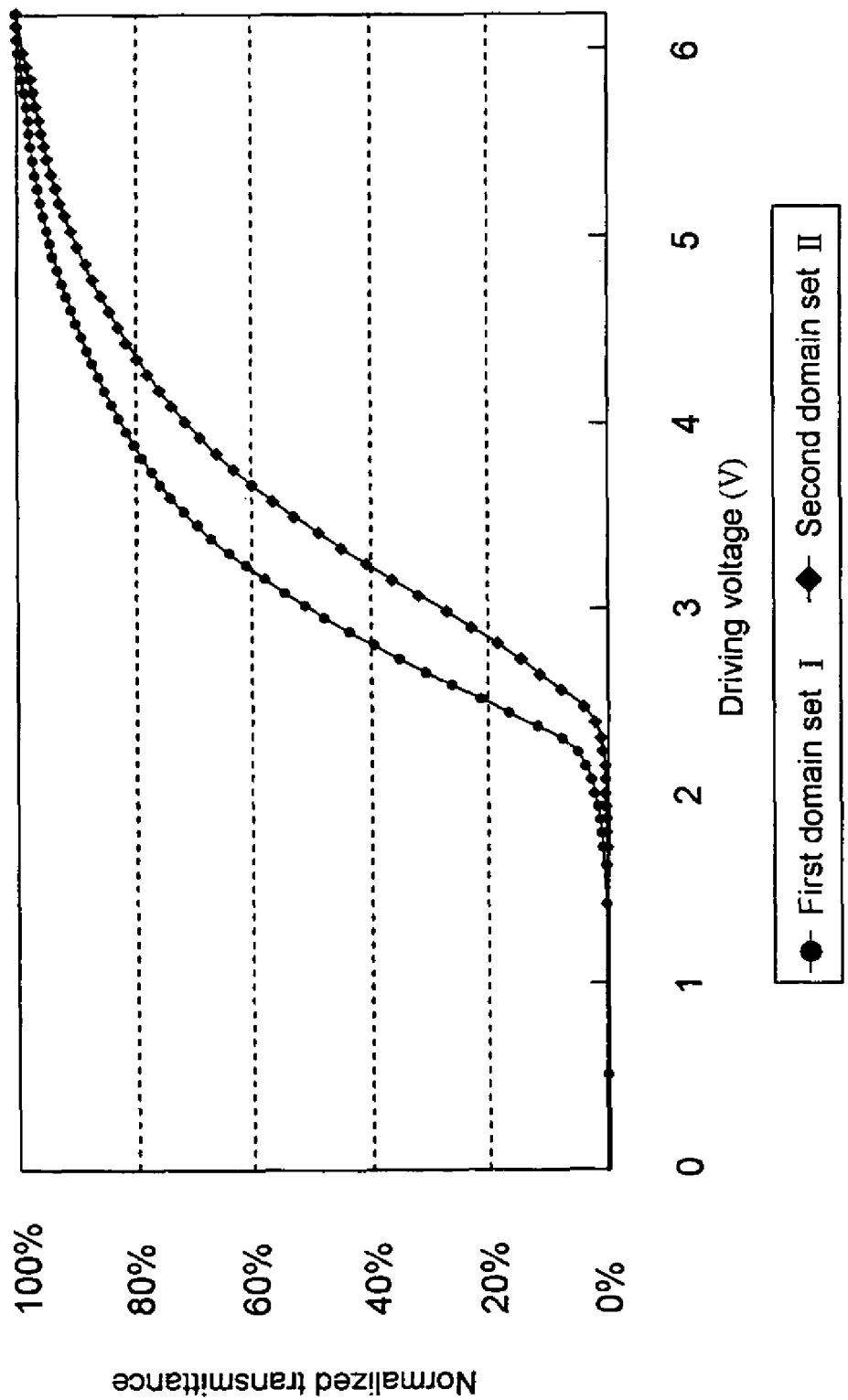
FIG. 9 is a chart curve representing relationships of voltage to normalized transmittance percentage according to the fourth embodiment.

FIG. 9 is a graph of curves representing relationships of driving voltage versus normalized transmittance percentage for different domain sets of the MVA LCD according to the fourth embodiment. The horizontal coordinate represents the driving voltage, and the vertical coordinate represents the normalized transmittance. The curve with circles represents the first domain set I and the curve with squares represents the second domain set II. It can be seen from FIG. 9 that at the same driving voltage, the transmittance of the first domain set I is different from that of the second domain set II. Thus, when the viewing angle changes, the first domain set I and the second domain set II compensate each other to eliminate dramatic changes in luminance as the viewing angle changes.

In summary, an MVA LCD according to some embodiments may have at least the following features:

I. The MVA LCD has multiple domain sets in which the liquid crystal molecules have different tilt angles, so that changes in luminance due to viewing angle changes will be reduced to improve the display quality.

II. The MVA LCD does not need additional photolithography/etching processing and is compatible with existing fabricating facilities.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A multi-domain vertically aligned liquid crystal display, comprising:

an active element array substrate that has a plurality of pixel units, wherein each pixel unit includes an active element and a pixel electrode that is electrically connected to the active element, the pixel electrode including a first alignment pattern and a second, different alignment pattern, wherein the first and second alignment patterns are electrically connected to the active element;

an opposite substrate that has a plurality of common electrodes, each common electrode corresponding to a pixel electrode and including a third alignment pattern and a fourth alignment pattern; and a liquid crystal layer, which is disposed between said active element array substrate and said opposite substrate, wherein a portion of the liquid crystal layer proximal each pixel unit is divided into a plurality of domain sets, each of which has plural domains, the first alignment pattern and the third alignment pattern correspond to a first of the domain sets, and the second alignment pattern and the fourth alignment pattern correspond to a second of the domain sets, wherein the first and third alignment patterns have a plurality of non-jagged slits, each of the first and third alignment patterns is without any jagged slits, and the second and fourth alignment patterns have a plurality of jagged slits.

2. The display of claim 1, wherein the area of the first domain set is the same as that of the second domain set.

3. The display of claim 1, wherein the jagged slits of the second and fourth alignment patterns are partially overlapped.

4. The display of claim 3, wherein the jagged slits of the second alignment pattern have a plurality of first fine slits with a length of P and the jagged slits of the fourth alignment pattern have a plurality of second fine slits, the first fine slits and the second fine slits overlapping a length of between P/3 and 2/3 P.

5. The display of claim 1, wherein the jagged slits of the second and fourth alignment patterns do not overlap.

6. The display of claim 1, wherein the second domain set has an area A, and the first domain set has an area between A/4 and A/2.

7. The display of claim 6, wherein the jagged slits of the second and fourth alignment patterns partially overlap.

8. The display of claim 7, wherein the jagged slits of the second alignment pattern have a plurality of first fine slits with a length of P and the jagged slits of the fourth alignment pattern have a plurality of second fine slits, the first fine slits and the second fine slits overlapping a length of between P/3 and 2/3 P.

9. The display of claim 6, wherein the jagged slits of the second and fourth alignment patterns do not overlap.

10. The display of claim 1, wherein the active element comprises a thin film transistor.

11. A multi-domain vertically aligned liquid crystal display, comprising:
an active element array substrate having a plurality of pixel units, wherein each pixel unit includes an active element and a pixel electrode that is electrically connected to the active element, the pixel electrode including a first alignment pattern having a plurality of first non-jagged slits without any jagged slits, and a second alignment pattern having a plurality of first jagged slits, wherein the first and second alignment patterns are electrically connected to the active element;
an opposite substrate having a plurality of common electrodes, each common electrode corresponding to a pixel electrode, wherein each common electrode includes a third alignment pattern having a plurality of second non-jagged slits without any jagged slits, and a fourth alignment pattern having a plurality of second jagged slits; and
a liquid crystal layer which is disposed between said active element array substrate and said opposite substrate, wherein a portion of the liquid crystal layer proximal each pixel unit is divided into a first domain set and a second domain set, each of the first and second domain sets including plural domains, the first alignment pattern and the third alignment pattern in a location corresponding to the first domain set, and the second alignment pattern and the fourth alignment pattern in a location corresponding to the second domain set.

12. The display of claim 11, wherein the area of the first domain set is the same as that of the second domain set.

13. The display of claim 11, wherein the area of the first domain set is different from that of the second domain set.

14. The display of claim 11, wherein the first jagged slits and the second jagged slits do not overlap.

15. The display of claim 11, wherein the first jagged slits and the second jagged slits partially overlap.

16. The display of claim 1, wherein the first and second alignment patterns are electrically connected to each other, and the third and fourth alignment patterns are electrically connected to each other.

17. The display of claim 1, wherein the third and fourth alignment patterns are formed of an electrically conductive material.

18. The display of claim 11, wherein the active element is a thin film transistor.

19. The display of claim 11, wherein the first and second alignment patterns are electrically connected to each other, and the third and fourth alignment patterns are electrically connected to each other.

20. The display of claim 11, wherein the third and fourth alignment patterns are formed of an electrically conductive material.

21. A method of building a multi-domain vertically aligned liquid crystal display, comprising:
providing an active element array substrate that has a plurality of pixel units, wherein each pixel unit includes an active element and a pixel electrode that is electrically connected to the active element, the pixel electrode including a first alignment pattern and a second, different alignment pattern, wherein the first and second alignment patterns are electrically connected to the active element;
providing an opposite substrate that has a plurality of common electrodes, each common electrode corresponding to a pixel electrode and including a third alignment pattern and a fourth alignment pattern that are formed of an electrically conductive material; and
disposing a liquid crystal layer between said active element array substrate and said opposite substrate, wherein a portion of the liquid crystal layer proximal each pixel unit is divided into a plurality of domain sets, each of which has plural domains, the first alignment pattern and the third alignment pattern correspond to a first of the domain sets, and the second alignment pattern and the fourth alignment pattern correspond to a second of the domain sets,
wherein the first and third alignment patterns have a plurality of non-jagged slits, each of the first and third alignment patterns is without any jagged slits, and the second and fourth alignment patterns have a plurality of jagged slits.

* * * * *